(12) United States Patent
Bush et al.

(10) Patent No.: US 8,781,129 B2
(45) Date of Patent: Jul. 15, 2014

(54) SYSTEMS, METHODS, AND APPARATUS FOR ELECTRICAL GRID QUANTUM KEY DISTRIBUTION

(75) Inventors: Stephen Francis Bush, Niskayuna, NY (US); Michael Mahony, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 156 days.

(21) Appl. No.: 13/267,597

(22) Filed: Oct. 6, 2011

(65) Prior Publication Data

US 2012/0213371 A1 Aug. 23, 2012

Related U.S. Application Data

(60) Provisional application No. 61/445,772, filed on Feb. 23, 2011.

(51) Int. Cl.
*H04L 29/06* (2006.01)
*H04L 9/08* (2006.01)

(52) U.S. Cl.
CPC ............ *H04L 63/064* (2013.01); *H04L 9/0852* (2013.01)
USPC ........................................................ 380/278

(58) Field of Classification Search
CPC ............................. H04L 63/064; H04L 9/0852
USPC ........................................................ 380/278
See application file for complete search history.

(56) References Cited

U.S. PATENT DOCUMENTS

| 5,768,378 | A | 6/1998 | Townsend et al. | |
| 2001/0055389 | A1* | 12/2001 | Hughes et al. | 380/44 |
| 2005/0144437 | A1 | 6/2005 | Ransom et al. | |
| 2007/0058810 | A1* | 3/2007 | Tanaka et al. | 380/210 |
| 2009/0175452 | A1 | 7/2009 | Gelfond et al. | |
| 2010/0037069 | A1* | 2/2010 | Deierling et al. | 713/193 |
| 2010/0329459 | A1 | 12/2010 | Wiseman et al. | |

FOREIGN PATENT DOCUMENTS

| EP | 1848174 A1 | 10/2007 |
| GB | 2411554 A * | 8/2005 |

OTHER PUBLICATIONS

Townsend et al., "Design of Quantum Cryptography Systems for Passive Optical Networks", Electronics Letters, vol. 30, Issue 22, pp. 1875-877, Oct. 27, 1994.

Maeda et al., "Technologies for Quantum Key Distribution Networks Integrated with Optical Communication Networks", IEEE Journal of Selected Topics in Quantum Electronics, vol. 15, Issue 6, pp. 1591-1601, Nov.-Dec. 2009.

Mohamad, "The Integration between Quantum Key Distribution (QKD) and Network Security Concepts", The 7th Conference of Science is the Pillar of the Sustainability of Peoples (MUC2011), pp. 1-14, Mar. 12-13, 2011, Ramadi, Iraq.

European Search Report and Written Opinion issued in connection with corresponding EP Application No. 12156410.8-1860 dated Nov. 18, 2013.

* cited by examiner

*Primary Examiner* — Hadi Armouche
*Assistant Examiner* — Dao Ho
(74) *Attorney, Agent, or Firm* — Nittin N. Joshi

(57) ABSTRACT

Systems, methods, and apparatus for electrical grid quantum key distribution is disclosed. According to the invention, a method is provided for secure communications in an electrical power distribution network. An example of the method can include evaluating vulnerability of communications control nodes associated with the network; distributing quantum encryption keys to one or more of the communications control nodes based, at least in part, on the vulnerability of the communications control nodes; and communicating among distributed electronic devices associated with the network using the quantum encryption keys.

20 Claims, 3 Drawing Sheets

SYSTEMS, METHODS, AND APPARATUS FOR ELECTRICAL GRID QUANTUM KEY DISTRIBUTION

RELATED APPLICATIONS

This application claims priority to U.S. provisional application Ser. No. 61/445,772, filed on Feb. 23, 2011, and entitled: "Method of Quantum Secure Key Distribution for the Smart Grid," the contents of which are hereby incorporated by reference in their entirety.

FIELD OF THE INVENTION

This invention generally relates to secure communications in an electrical grid, and in particular, to quantum key distribution in an electrical grid.

BACKGROUND OF THE INVENTION

The North American electric power network is often considered the largest and most complex machine in the world with approximately 15,000 generators in 10,000 power plants and hundreds of thousands of miles of transmission lines and distribution networks. Modernization of the electric power network to make it a so-called "smart grid" includes an extensive addition of communications networks distributed throughout the electrical transmission and distribution systems. Thus, the North American electric power grid is also becoming an ever more complex system that may be exposed to cyber-attack.

A common solution to defend against cyber-attack and secure the integrity of the power grid is to use encryption, which can provide confidentiality, authentication, and secure communications. The challenge is that there are tens to hundreds of thousands of power system devices installed throughout the grid that perform critical functions from power protection to power flow control and optimization. In order for encryption to work, encryption keys must be distributed to each of these devices in a secure manner. Loss of an encryption key can render the encryption useless.

BRIEF SUMMARY OF THE INVENTION

Some or all of the above needs may be addressed by certain embodiments of the invention. Certain embodiments of the invention may include systems, methods, and apparatus for electrical grid quantum key distribution.

According to an example embodiment of the invention, a method is provided for secure communications in an electrical power distribution network. Example embodiments of the method can include evaluating vulnerability of communications control nodes associated with the network; distributing quantum encryption keys to one or more of the communications control nodes based, at least in part, on the vulnerability of the communications control nodes; and communicating among distributed electronic devices associated with the network using the quantum encryption keys.

According to another example embodiment, a system is provided for secure communications in an electrical power distribution network. Example embodiments of the system can include one or more communications control nodes associated with the electrical power distribution network. The system can include a controller for evaluating vulnerability of communications control nodes; and a quantum key distribution module for distributing quantum encryption keys to the one or more communications control nodes based at least in part on the vulnerability of the communications control nodes.

According to another example embodiment, an apparatus is provided for securing communications. The apparatus can include at least one memory that stores computer-executable instructions; at least one processor configured to access the at least one memory, wherein the at least one processor is configured to execute the computer-executable instructions to: evaluate vulnerability of one or more communications control nodes associated with an electrical power distribution network; and distribute one or more quantum encryption keys to the one or more communications control nodes based at least in part on the vulnerability of the communications control nodes.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
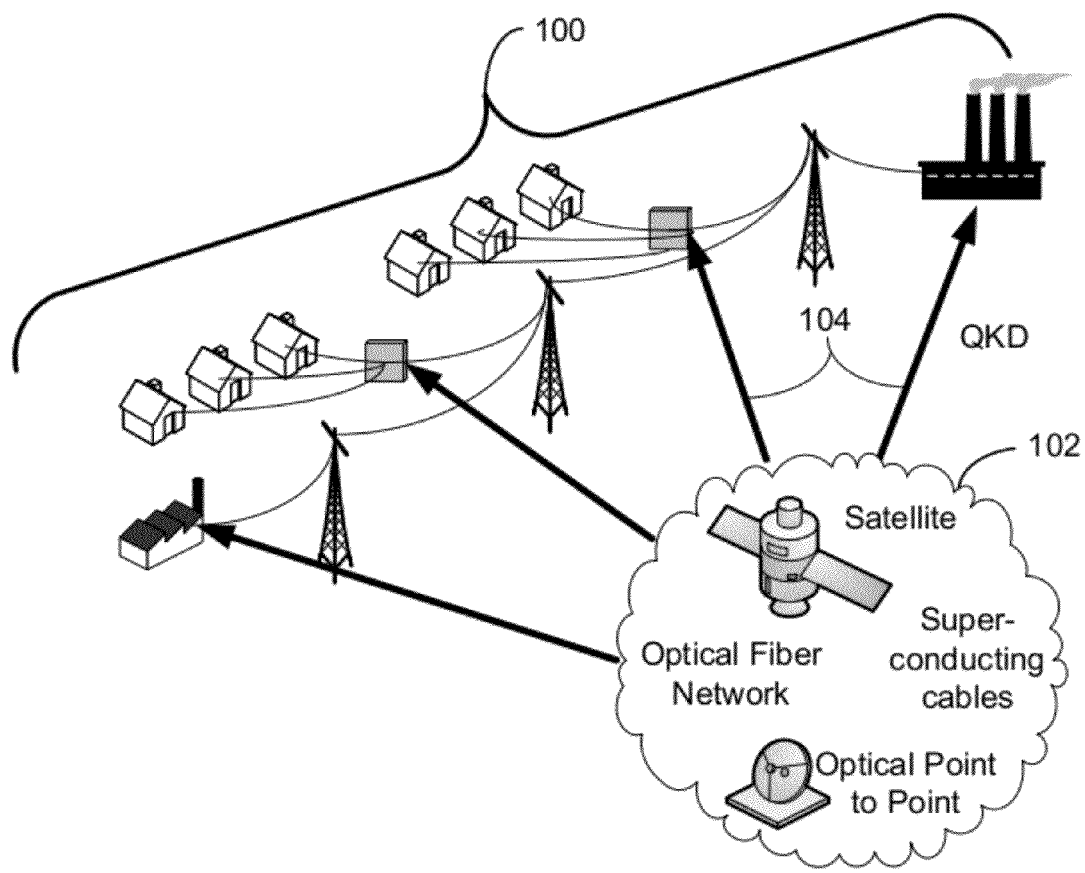
FIG. 1 is a block diagram of an illustrative power distribution network with quantum key distribution, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Certain embodiments of the invention may enable securely distributing encryption keys to selected nodes of a communications system associated with an electrical grid. According to certain example embodiments, the encryption keys may include quantum keys so that interception of the keys can be detected. Example embodiments can include quantum key distribution for use within the smart grid. Example embodiments may be utilized on a large-scale grid. Example embodiments may include evaluating nodes of the electrical grid for vulnerability, and prioritizing those nodes, for example, from a cost or risk/reward standpoint, to determine which nodes will include the necessary equipment for quantum key distribution.

Traditional cryptography relies on the computational difficulty of mathematical functions and employs mathematical techniques to restrict eavesdroppers from learning the contents of encrypted messages. Quantum key distribution differs from traditional cryptography in that it relies on physics to achieve the same objectives. Quantum key distribution allows communicating users to detect the presence of a third party trying to gain knowledge of the encryption key. What the eavesdropper can measure, and how, depends exclusively on the laws of physics.

According to an example embodiment, photon transmission may be utilized to distribute or exchange keys between devices. Once the keys are exchanged securely, normal operation can take place using any traditional protocol, including radio frequency. Example embodiments provide a mechanism for quantum key exchange and/or distribution that minimizes equipment cost for the utility while maintaining communications security.

According to example embodiments, transmission and distribution networks may include substations that may house critical equipment, and such substations may be distributed throughout the country. According to example embodiments, many hundreds or thousands of miles of open radio frequency communication channels may be utilized to communicate among distributed intelligent electronic devices. Example embodiments of the invention may enable communication among these devices, and may make the communication as secure as possible, including detecting lost or comprised encryption keys.

Example embodiments may utilize optical communication channels to distribute or exchange quantum keys. Example optical communication channels may include free-space optical channels, satellite to ground optical channels, and/or optical fiber communication channels. Other quantum key distribution methods may be utilized, according to example embodiments, including electric vehicles, power line inspection/repair robots, or a field engineer manually operating a photonic quantum key distribution device.

Unlike telecom networks, smart grids are typically composed of control nodes separated by at most a few kilometers. The short node separation makes smart grids a good candidate for quantum key distribution technology. According to an example embodiment, a quantum key distribution link may connect two stations: Alice and Bob. In an example embodiment, Alice may initiate communication by encoding information in entangled single-photon states, while Bob tries to detect the photons and decode their state. According to an example embodiment, the entanglement-based communication schemes may involve photon pair production and entanglement. Example embodiments may include systems having high-power pump lasers and a multitude of single-photon detectors. Other example embodiments may include inexpensive laser diodes operating in the gain-switched regime and attenuated to a sub-photon per pulse level. In accordance with certain example embodiments, the system may be simplified to include a single Alice that can communicate with multiple Bob's, who can either detect a photon or simply redirect it to the next station. Alternatively, a single Bob can receive photons from multiple Alices.

According to example embodiments of the invention, various methods may be utilized for determining which nodes to include in the quantum key distribution, and various system parts and/or apparatus may be utilized to distribute the quantum keys. These systems, methods, and apparatus will now be described with reference to the accompanying figures.

FIG. 1 illustrates an example power distribution network 100 with a quantum key distribution network 102. For example, the power distribution network 100 may include a power grid including generation, transmission, distribution and consumption nodes. Example embodiments may also include communication networks, for example, to provide information that may facilitate distributed generation, demand-response mechanisms for the consumers, intelligent collaborative transmission and/or distribution including new synchrophasor applications, state estimation, and protection mechanisms. According to example embodiments, such smart grid features may be enabled by communication among intelligent power system devices. According to an example embodiment, quantum key distribution networks 102 may include, but are not limited to, satellites, optical fiber networks, super conducting cables, and optical point-to-point (free-space) channels. The quantum key distribution networks 102 may communicate 104 with selected generation, transmission, distribution and consumption nodes. According to an example embodiment, once the quantum keys have been distributed to the selected nodes in the power distribution network 100, traditional encrypted communication methods may be utilized for communication among the various generation, transmission, distribution and consumption nodes.

Figure 2:
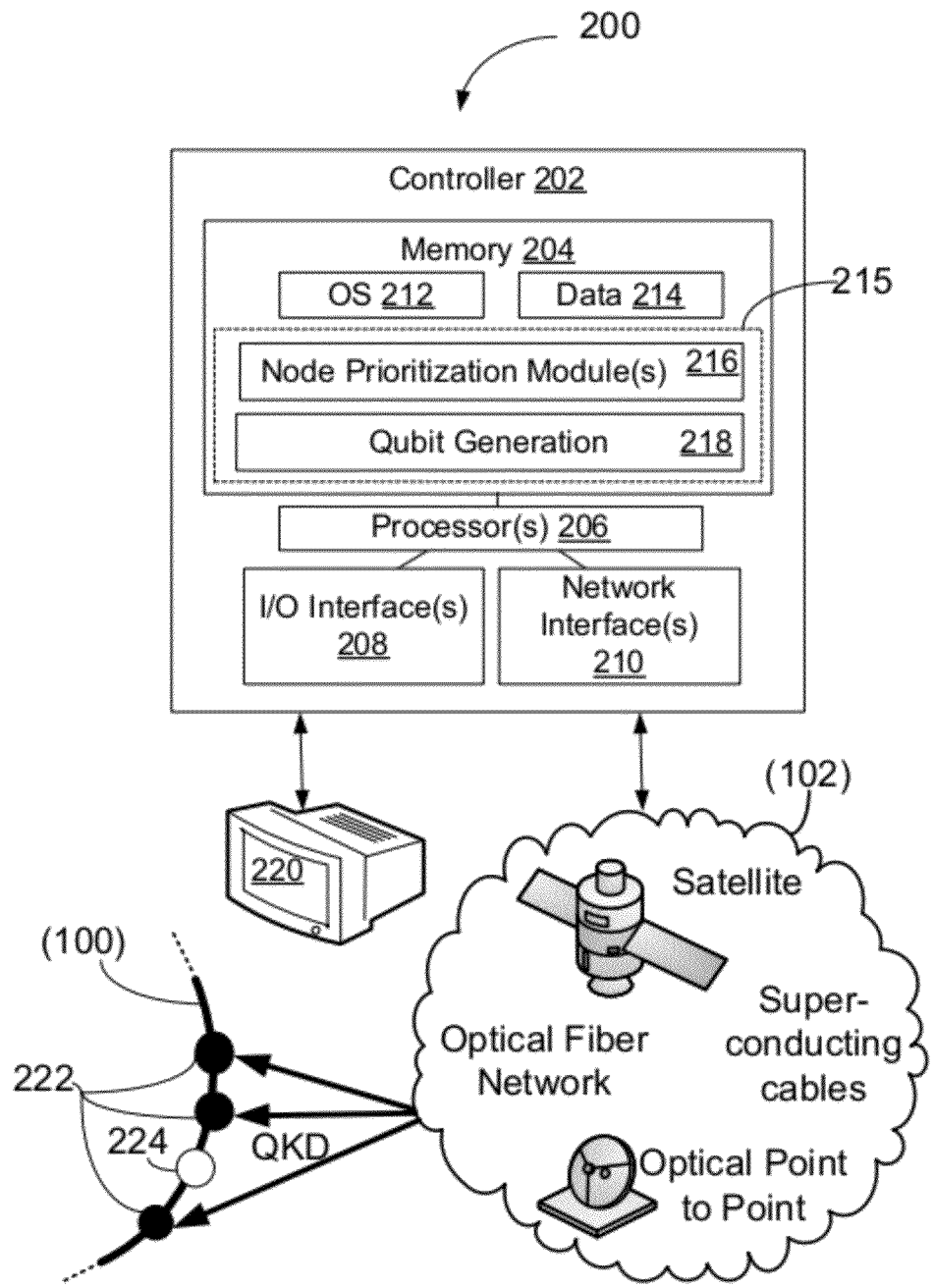
FIG. 2 is a block diagram of an illustrative node prioritization system, according to an example embodiment of the invention.

FIG. 2 depicts an example node prioritization system 200, according to example embodiments of the invention. For example, the node prioritization system 200 may be utilized to determine which nodes should be included in the quantum key distribution network. Criteria such as costs, vulnerability, risk, etc. may be utilized for the prioritizing the nodes. According to an example embodiment, the node prioritization system 200 may include a controller 202, which may include a memory 204, one or more processors 206, one or more input/output interfaces 208 and/or one or more network interfaces 210. Example embodiments of the controller 202 may include within the memory 204 an operating system 212, data 214, and a quantum key distribution module 215. The quantum key distribution module 215 can include one or more node prioritization modules 216 and quantum bit (qubit) generation module 218. A qubit, for example, is a unit of quantum information with additional dimensions associated to the quantum properties of a physical atom. A qubit represents both the state memory and the state of entanglement in a system. A quantum computation may be performed by initializing a system of qubits with a quantum algorithm that puts the system into an entangled state.

The qubit is described by a quantum state in a two-state quantum-mechanical system, which is formally equivalent to a two-dimensional vector space over the complex numbers. One example of a two-state quantum system is the polarization of a single photon: here the two states are vertical polarization and horizontal polarization. In a classical system, a bit would have to be in one state or the other, but quantum mechanics allows the qubit to be in a superposition of both states at the same time, a property which is fundamental to quantum computing. In an example embodiment, the qubit generation module 218 may handle the necessary functions related to qubit generation, entanglement, and encoding.

According to example embodiments, the controller 202 may be in communication with a local workstation 220. Example embodiments may provide for communication with remote workstations (not shown) via the network interface 210. The node prioritization system can may be in communication with the quantum key distribution system (as in 102 of FIG. 1) which may be in communication with the power distribution network (as in 100 of FIG. 1). In example embodiments, power distribution network (as in 100 of FIG. 1) may include communication nodes that may be identified as high priority control nodes 222, or may be identified as low priority control nodes 224. According to an example embodiment the quantum key distribution system (as in 102 of FIG. 1) may be utilized to distribute quantum keys to the high priority control nodes 222.

Figure 3:
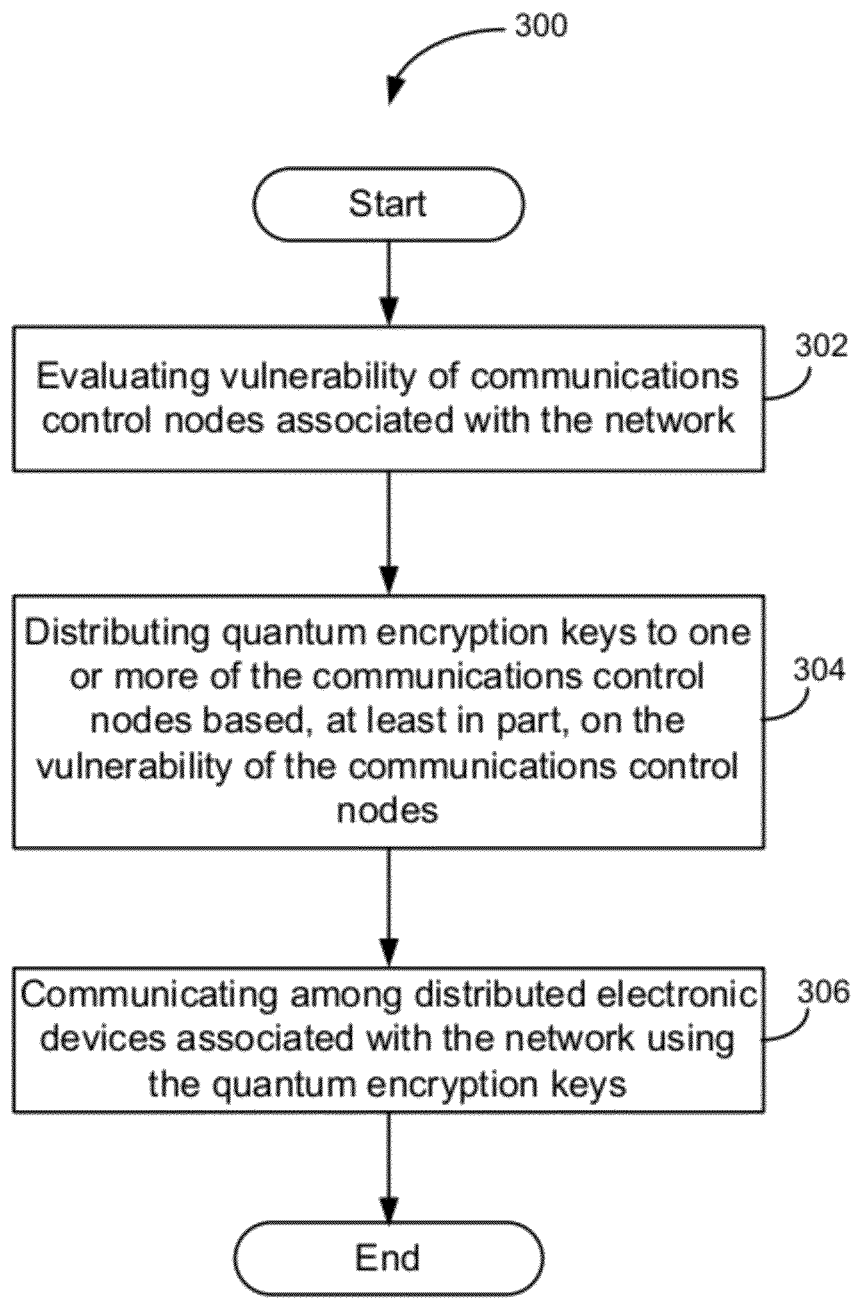
FIG. 3 is a flow diagram of an example method according to an example embodiment of the invention.

An example method 300 for providing secure communications in an electrical power distribution network will now be described with reference to the flowchart of FIG. 3. The method 300 starts in block 302 and includes evaluating vulnerability of communications control nodes associated with the network. In block 304, the method 300 includes distributing quantum encryption keys to one or more of the communications control nodes based, at least in part, on the vulnerability of the communications control nodes. In block 306, the method includes communicating among distributed electronic devices associated with the network using the quantum encryption keys. The method ends after block 306.

Example embodiments of the invention may further include detecting lost or compromised encryption keys. In example embodiments, evaluating vulnerability of the communications control nodes 222, 224 can include determining which of the communications control nodes 222, 224, if faulted, would have a maximum impact on a system interruption duration. According to example embodiments, distributing the quantum encryption keys 104 includes communicating by one or more of free space optics, satellite, optical fiber, superconducting power cable, or point-to-point manual distribution. According to example embodiments, evaluating vulnerability of communications control nodes 222, 224 can include simulating faults associated with the communications control nodes 222, 224; determining isolated communications control nodes 222, 224; determining restored communications control nodes 222, 224; and computing a system average interruption delay index (SAIDI) based at least on the isolated and restored communications control nodes 222, 224. In an example embodiment, the computing a system average interruption delay index (SAIDI) is further based on communication delays and a number of customers per feeder associated with the communications control nodes 222, 224. In example embodiments, evaluating vulnerability of the communications control nodes 222, 224 includes evaluating one or more of a degree of node isolation, a distance between a recloser and a tie-switch, or latencies between communications control nodes 222, 224.

Example embodiments can include a system for providing secure communications in an electrical power distribution network 100. The electrical power distribution network 100 can include one or more communications control nodes 222, 224 associated with the electrical power distribution network 100. Example embodiments of the system can include a controller 202 for evaluating vulnerability of communications control nodes 222, 224; and a quantum key distribution module 215 for distributing quantum encryption keys (104) to the one or more communications control nodes 222, 224 based at least in part on the vulnerability of the communications control nodes 222, 224.

Example embodiments of the system include one or more communication channels for communicating securely among distributed electronic devices associated with the network 100 using the distributed quantum encryption keys 104. In example embodiments, the one or more communication channels are operable to detect lost or compromised encryption keys.

In example embodiments, the controller 202 is operable for evaluating which of the communications control nodes 222, 224, if faulted, would have a maximum impact on a system interruption duration. In example embodiments, the quantum key distribution network module 215 communicates via one or more of free space optics, satellite, optical fiber, superconducting power cable, or point-to-point manual distribution. In example embodiments, the controller 202 evaluates vulnerability of communications control nodes 222, 224 by one or more of: simulating faults associated with the communications control nodes 222, 224; determining isolated communications control nodes 222, 224; determining restored communications control nodes 222, 224; and computing a system average interruption delay index (SAIDI) based at least on the isolated and restored communications control nodes 222, 224. In an example embodiment, computing a system average interruption delay index (SAIDI) is further based on communication delays and a number of customers per feeder associated with the communications control nodes 222, 224. In an example embodiment, evaluating the vulnerability of the communications control nodes 222, 224 includes evaluating at least one of a degree of node isolation, a distance between a recloser and a tie-switch, or latencies between communications control nodes 222, 224.

Example embodiments can include an apparatus for providing securing communications. The apparatus can include at least one memory 204 that stores computer-executable instructions; at least one processor 206 configured to access the at least one memory 204, wherein the at least one processor 206 is configured to execute the computer-executable instructions to: evaluate vulnerability of one or more communications control nodes 222, 224 associated with an electrical power distribution network 100; and distribute one or more quantum encryption keys 104 to the one or more communications control nodes 222, 224 based at least in part on the vulnerability of the communications control nodes 222, 224. According to an example embodiment, the apparatus may be utilized for communicating among distributed electronic devices associated with the network 100 using the distributed quantum encryption keys 104. In an example embodiment, the apparatus may be utilized for detecting lost or compromised encryption keys.

According to an example embodiment, the apparatus, may further be utilized for evaluating which control communications control nodes 222, 224, if faulted, would have a maximum impact on a system interruption duration. In an example embodiment, one or more quantum encryption keys 104 to the one or more communications control nodes 222, 224 includes communicating via one or more of free space optics, satellite, optical fiber, superconducting power cable, or point-to-point manual distribution.

According to example embodiments, after the quantum encryption keys 104 have been distributed to the one or more communications control nodes 222, 224, encrypted communications may be performed among distributed electronic devices by utilizing the quantum encryption keys 104. In example embodiments, the encrypted communications can include utilizing sound waves, radio waves, microwaves, or light waves in communications among the distributed electronic devices. In example embodiments, communication means can include one or more of land-based, satellite-to-terrestrial, optical fiber, local area networks, wide-area networks, internet, land-line, power line, line-of-sight, or SMS communications channels or systems.

According to example embodiments, certain technical effects can be provided, such as creating certain systems, methods, and apparatus that provide distribution of quantum keys.

Example embodiments of the invention can provide the further technical effects of providing systems, methods, and apparatus for providing a secure smart grid communications network.

In example embodiments of the invention, the power distribution network 100 and the node prioritization system 200 may include any number of hardware and/or software applications that are executed to facilitate any of the operations.

In example embodiments, one or more I/O interfaces may facilitate communication between the power distribution network 100 and the node prioritization system 200, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the power distribution network 100 and the node prioritization system 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the power distribution network 100 and the node prioritization system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the power distribution network 100 and the node prioritization system 200 with more or less of the components illustrated in FIGS. 1 and 2.

Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for providing secure communications in an electrical power distribution network, the method comprising:
    evaluating vulnerability of communications control nodes associated with the network;
    distributing quantum encryption keys to one or more of the communications control nodes based, at least in part, on the vulnerability of the communications control nodes; and
    communicating among distributed electronic devices associated with the network using the quantum encryption keys,
wherein evaluating vulnerability of communications control nodes comprises:
    simulating faults associated with the communications control nodes;
    determining isolated communications control nodes;
    determining restored communications control nodes; and
    computing a system average interruption delay index (SAIDI) based at least on the isolated and restored communications control nodes.

2. The method of claim 1, further comprising detecting lost or compromised encryption keys.

3. The method of claim 1, wherein evaluating vulnerability of the communications control nodes comprises determining which of the communications control nodes, if faulted, would have a maximum impact on a system interruption duration.

4. The method of claim 1, wherein distributing the quantum encryption keys comprises communicating by one or more of free space optics, satellite, optical fiber, superconducting power cable, or point-to-point manual distribution.

5. The method of claim 1, wherein computing a system average interruption delay index (SAIDI) is further based on communication delays and a number of customers per feeder associated with the communications control nodes.

6. The method of claim 1, wherein evaluating vulnerability of the communications control nodes comprises evaluating one or more of a degree of node isolation, a distance between a recloser and a tie-switch, or latencies between communications control nodes.

7. The method of claim 1, wherein communicating among distributed electronic devices comprises utilizing sound waves, radio waves, microwaves, or light waves in communication channels comprising one or more of land-based, satellite-to-terrestrial, optical fiber, local area networks, wide-area networks, internet, land-line, power line, line-of-sight, or SMS communications systems.

8. A system for providing secure communications in an electrical power distribution network comprising one or more communications control nodes associated with the electrical power distribution network, the system comprising:
　a controller for evaluating vulnerability of communications control nodes, the controller including at least one memory that stores computer-executable instructions, and at least one processor configured to access the at least one memory, wherein the at least one processor is configured to execute the computer-executable instructions to:
　　evaluate vulnerability of one or more communications control nodes associated with an electrical power distribution network; and
　　distribute one or more quantum encryption keys to the one or more communications control nodes based at least in part on the vulnerability of the communications control nodes,
　wherein the processor evaluates vulnerability of communications control nodes by one or more of:
　simulating faults associated with the communications control nodes;
　determining isolated communications control nodes;
　determining restored communications control nodes; and
　computing a system average interruption delay index (SAIDI) based at least on the isolated and restored communications control nodes.

9. The system of claim 8, further comprising one or more communication channels for communicating securely among distributed electronic devices associated with the network using the distributed quantum encryption keys.

10. The system of claim 9, wherein the one or more communication channels are operable to detect lost or compromised encryption keys.

11. The system of claim 9, wherein the one or more communication channels for communicating securely among distributed electronic devices comprise land-based, satellite-to-terrestrial, optical fiber, local area networks, wide-area networks, internet, land-line, power line, line-of-sight, or SMS communications channels.

12. The system of claim 8, wherein the controller is operable for evaluating which of the communications control nodes, if faulted, would have a maximum impact on a system interruption duration.

13. The system of claim 8, wherein computing a system average interruption delay index (SAIDI) is further based on communication delays and a number of customers per feeder associated with the communications control nodes.

14. The system of claim 8, wherein evaluating the vulnerability of the communications control nodes comprises evaluating at least one of a degree of node isolation, a distance between a recloser and a tie-switch, or latencies between communications control nodes.

15. An apparatus for providing securing communications, the apparatus comprising:
　at least one memory that stores computer-executable instructions; and
　at least one processor configured to access the at least one memory, wherein the at least one processor is configured to execute the computer-executable instructions to:
　　evaluate vulnerability of one or more communications control nodes associated with an electrical power distribution network; and
　　distribute one or more quantum encryption keys to the one or more communications control nodes based at least in part on the vulnerability of the communications control nodes,
　wherein evaluating vulnerability of communications control nodes comprises:
　simulating faults associated with the communications control nodes;
　determining isolated communications control nodes;
　determining restored communications control nodes; and
　computing a system average interruption delay index (SAIDI) based at least on the isolated and restored communications control nodes.

16. The apparatus of claim 15, wherein the computer-executable instructions are further configured to: communicate among distributed electronic devices associated with the network using the distributed quantum encryption keys.

17. The apparatus of claim 16, wherein the computer-executable instructions are further configured to: detect lost or compromised encryption keys.

18. The apparatus of claim 16, wherein communication among distributed electronic devices associated with the network comprises utilizing sound waves, radio waves, microwaves, or light waves in communication channels comprising one or more of land-based, satellite-to-terrestrial, optical fiber, local area networks, wide-area networks, internet, land-line, power line, line-of-sight, or SMS communications systems.

19. The apparatus of claim 15, wherein the computer-executable instructions are further configured to: evaluate which control communications control nodes, if faulted, would have a maximum impact on a system interruption duration.

20. The apparatus of claim 15, wherein the computer-executable instructions configured to distribute one or more quantum encryption keys to the one or more communications control nodes comprises computer-executable instructions configured to communicate via one or more of free space optics, satellite, optical fiber, superconducting power cable, or point-to-point manual distribution.

* * * * *